United States Patent
Peterman et al.

(10) Patent No.: US 9,315,338 B2
(45) Date of Patent: Apr. 19, 2016

(54) ARTICLE METERING APPARATUS, SYSTEM AND METHODS

(71) Applicant: Douglas Machine Inc., Alexandria, MN (US)

(72) Inventors: Thomas H. Peterman, Alexandria, MN (US); Irvan L. Pazdernik, Alexandria, MN (US); Richard W. Lukanen, Jr., Alexandria, MN (US); Matthew D. Toyli, Parkers Prairie, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 14/373,187

(22) PCT Filed: Jan. 18, 2013

(86) PCT No.: PCT/US2013/022158
§ 371 (c)(1),
(2) Date: Jul. 18, 2014

(87) PCT Pub. No.: WO2013/109900
PCT Pub. Date: Jul. 25, 2013

(65) Prior Publication Data
US 2014/0353121 A1 Dec. 4, 2014

Related U.S. Application Data

(60) Provisional application No. 61/587,982, filed on Jan. 18, 2012.

(51) Int. Cl.
*B65G 47/29* (2006.01)
*B65G 47/88* (2006.01)
*B65G 47/08* (2006.01)

(52) U.S. Cl.
CPC .............. *B65G 47/29* (2013.01); *B65G 47/088* (2013.01); *B65G 47/8815* (2013.01); *B65G 47/8892* (2013.01); *B65G 47/295* (2013.01); *B65G 2201/0244* (2013.01)

(58) Field of Classification Search
CPC ...... B65G 47/088; B65G 47/26; B65G 47/28; B65G 47/29; B65G 47/295; B65G 47/8815; B65G 47/8892; B65G 2201/0244
See application file for complete search history.

(56) References Cited

U.S. PATENT DOCUMENTS

| 4,522,294 A | 6/1985 | Walz |
| 4,832,178 A | 5/1989 | Anderson et al. |

(Continued)

FOREIGN PATENT DOCUMENTS

| JP | 05170332 A | 7/1993 |

OTHER PUBLICATIONS

Young, Lee W., PCT International Search Report and Written Opinion of the International Searching Authority, PCT Application No. PCT/US13/22158, Apr. 8, 2013.

(Continued)

*Primary Examiner* — Leslie A Nicholson, III
*Assistant Examiner* — Keith R Campbell
(74) *Attorney, Agent, or Firm* — Dicke, Billig & Czaja, PLLC

(57) ABSTRACT

An article metering system is generally provided. The system is primarily comprised of a conveyor section, for receipt of a bulk flow of articles and conveyance of spaced apart metered article groups downstream of an ingress portion thereof, and an article metering station characterized by an article metering apparatus characterized by a drive assembly and a driven member driven thereby. The driven member includes an end effector for select positioning between adjacent articles of articles of the bulk flow of articles received by the conveyor section in furtherance of delimiting a downstream spaced apart metered article group characterized by a select number of columns. The drive assembly includes cooperatively driven servo drives to effectuate travel of the end effector in either of a downstream article flow direction or an upstream article flow direction, and an up/down direction in relation to articles of the bulk flow of articles received by the conveyor section.

14 Claims, 11 Drawing Sheets

(56) References Cited

U.S. PATENT DOCUMENTS

| | | | |
|---|---|---|---|
| 4,911,601 A | 3/1990 | Muramatsu et al. | |
| 5,147,027 A | 9/1992 | Cruver | |
| 5,201,823 A | 4/1993 | Pazdernik | |
| 5,522,692 A * | 6/1996 | Simkowski | B65G 47/088 414/789.5 |
| 6,374,984 B1 * | 4/2002 | Nagler | B07C 5/361 177/1 |
| 6,843,360 B2 | 1/2005 | Peterman et al. | |
| 6,907,980 B2 | 6/2005 | Iwasa et al. | |
| 6,923,311 B2 | 8/2005 | Cassoli et al. | |
| 6,953,113 B2 | 10/2005 | Iwasa et al. | |
| 7,066,317 B2 | 6/2006 | Iwasa et al. | |
| 7,222,716 B2 | 5/2007 | Peterman et al. | |
| 7,533,768 B2 * | 5/2009 | Floding | B65B 35/405 198/418.6 |
| 7,726,463 B2 | 6/2010 | Aronsson | |
| 7,784,599 B2 * | 8/2010 | Balleza | A21C 9/085 198/429 |
| 7,815,034 B2 * | 10/2010 | Fleck | B65B 35/405 198/418.7 |
| 7,980,381 B2 | 7/2011 | Trejo | |
| 8,011,495 B2 | 9/2011 | Anderson et al. | |
| 8,113,335 B2 | 2/2012 | Aronsson et al. | |
| 8,672,117 B2 * | 3/2014 | Stahl | B65B 23/14 198/418.1 |
| 2007/0125239 A1 | 6/2007 | Balleza et al. | |
| 2007/0227857 A1 | 10/2007 | Peterman et al. | |
| 2008/0099307 A1 | 5/2008 | Fleck et al. | |
| 2009/0124026 A1 | 5/2009 | Bassi | |
| 2010/0101191 A1 * | 4/2010 | Lindee | B65J 9/0093 53/471 |
| 2011/0005898 A1 | 1/2011 | Pundsack et al. | |
| 2011/0067975 A1 * | 3/2011 | Pazdernik | B65G 47/088 198/429 |
| 2014/0262685 A1 * | 9/2014 | Job | B65G 47/29 198/419.1 |
| 2015/0090643 A1 * | 4/2015 | Struijk | B65G 47/26 209/577 |

OTHER PUBLICATIONS

Mohri, Mineko, PCT International Preliminary Report on Patentability, PCT Application No. PCT/US13/22158, May 7, 2015.

* cited by examiner

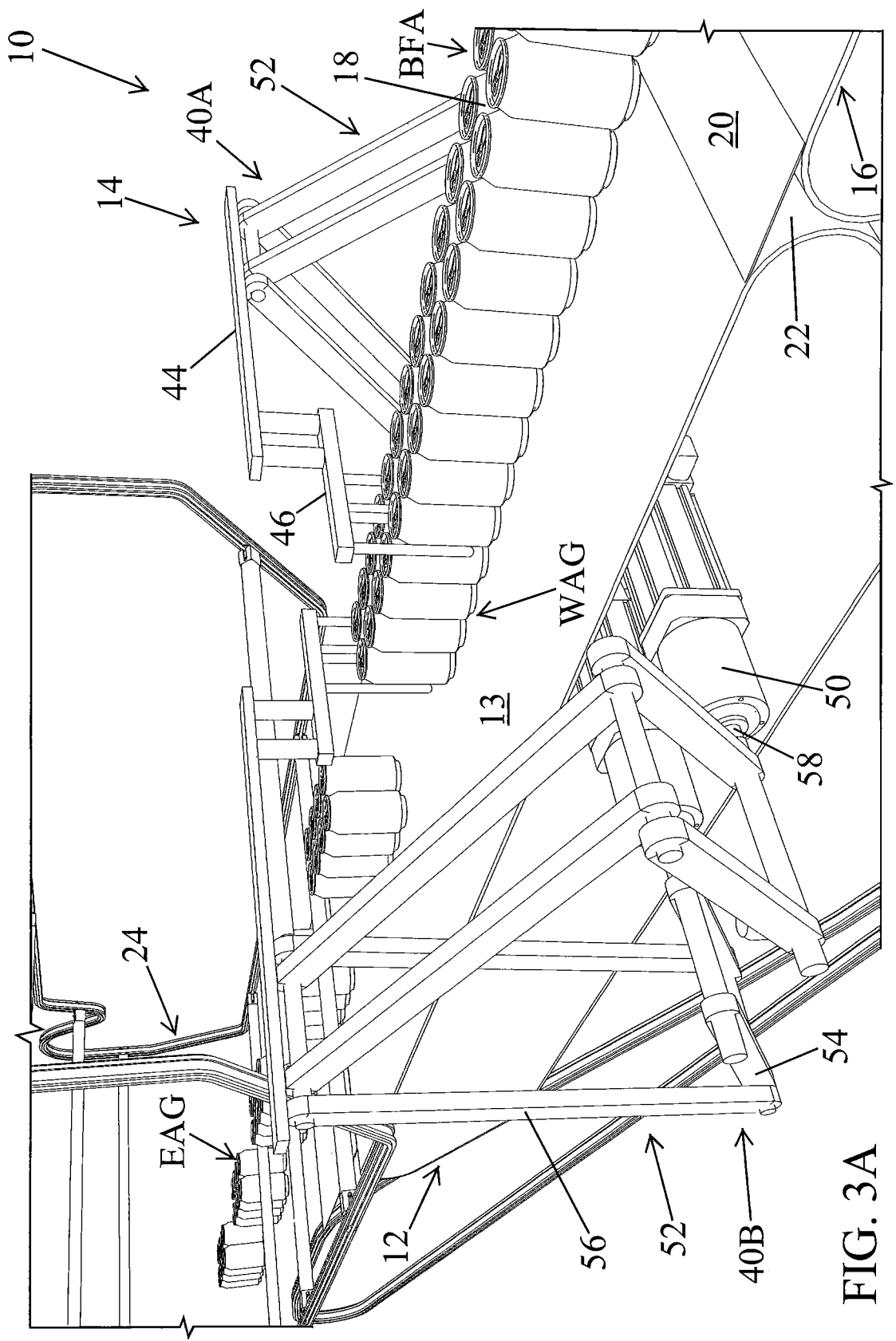

ARTICLE METERING APPARATUS, SYSTEM AND METHODS

This is an international application filed under 35 USC §363 claiming priority under 35 USC §120 of/to U.S. Pat. Appl. Ser. No. 61/587,982 filed Jan. 18, 2012 and entitled ARTICLE METERING APPARATUS, SYSTEM & METHODS, the disclosure of which is hereby incorporated by reference in its entirety.

TECHNICAL FIELD

The present invention generally relates to article metering, more particularly, to apparatus, systems and methods for metering articles from a continuous/semi-continuous/batch-continuous stream into an article group and/or pack pattern in advance of loading/packing operations, more particularly still, to metering operations which are fast and reliable using one or more mechanisms which permit a high degree of processing variability, i.e., a wide variety of different articles, e.g., cans, bottles, jars, cartons, bundles, trays, etc. and differently sized/configured articles of a select article type, and which provide load sensing and commensurate process control so as to yield overall improved process management.

BACKGROUND OF THE INVENTION

In a typical packing operation, articles (i.e., "products") approach a packaging station or the like via a continuous or semi-continuous stream having origins in an upstream bulk flow of articles. As such operations/processing lines are more often than not intended to aggregate articles in multiples in furtherance of establishing a multi-pack of articles, e.g., multi-pack cases (e.g., 6, 12, 24 article packs or bundles), stacked trays of arrayed articles, etc., it is necessary to manage, prepare or ready the continuous inflow stream of articles so as to separate the articles into groups or select groups as is generally well known. Once grouped or collated, the article group or set may be further processed, such as by being placed into a pack pattern and/or packed into a film over-wrap or corrugated wrap. Notionally, article metering, article separation, and article loading (e.g., case or carton loading) are requisite steps attendant to a majority of article packaging operations.

Notionally, articles are sequentially passed to and through a variety of "stations" whereupon the articles are operated upon in furtherance of metering, grouping, spacing apart the groupings, and/or packing/bundling etc. Commonly, a series of conveying mechanisms, e.g., step operated belt conveyors or the like, are provided to transport or selectively transport the articles. For example, and by way of illustration, conveyance mechanisms may be provided in connection to article supply, article infeed, article group sweep/outfeed.

Conveyance and operational or functional transition points generally require attention, care and management. For instance, article conveyance may be specifically arrested via a holding belt or belts as taught by Cruver (U.S. Pat. No. 5,147,027), or via a retaining member or retaining device as taught by Aronsson (U.S. Pat. Nos. 7,726,463 & 8,113,335, respectively), in advance of article grouping via a metering station characterized by track mounted metering pins or bars which engage either or both of a trailing or leading article group "face" during travel about a fixed travel path delimited by the track. Ramifications of such arrest or selective retention are varied, primarily a function of the character of article, e.g., its compressibility or notionally its "elasticity," as well as its configuration/center of gravity, etc.). Typically, the "cost" of surge management has been the use of dedicated arresting/retention devices and an attendant methodical, discrete processing step which generally slows article processing.

As to article metering and/or metering and separation operations, approaches disclosed by Peterman et al. (U.S. Pat. Nos. 6,843,360, 7,222,716 & 7,533,768) and Pundsack et al. (WO 2009/124026 A1), each of which is incorporated herein by reference in their entireties, generally improve upon, among others, the approaches noted above. The manner of metering and separating product described and shown, namely, one characterized by, among other things, a stationary or fixed transfer plate bridging infeed and sweep conveyors, a product or article transfer device (e.g., a "slip sheet") and/or a "control device" for at least registering a leading edge or face of the article group on the transfer device or the like, has enjoyed considerable market success, and is generally recognized as a differentiated approach to heretofore known operations.

In addition to being a known, welcome improvement over heretofore incremental advances in or with regard to prior "pin" metering devices, e.g., see the work of Pazdernik (U.S. Pat. No. 5,201,823) and Anderson et al. (U.S. Pat. No. 4,832,178) which generally and notionally create a select spaced apart condition for and between articles via the imposition of pins between adjacent articles from below, pins which function to restrain an upstream article of adjacent article while advancing (e.g., pushing) the downstream article of the adjacent articles, the article transfer device is an elegant solution in furtherance of improved processing speed, via among other things, the elimination of article infeed arresting and its inherent stop/start interval. Moreover, further advances embodied in dual "slip sheet" approaches, such as that disclosed by Pazdernik (U.S. Pub. No. US 2011/0067975), and in an endless loop (i.e., non retractable) "slip sheet," such as that disclosed by Anderson et al. (U.S. Pat. No. 8,011,495), each of which are incorporated herein by reference in their entireties, have likewise enjoyed and continue to enjoy commercial success.

With current metering/metering-separating approaches characterized by track supported metering bars (or alignment bars, or sweep bars, or dual function align-sweep bars) for select engagement of articles part-and-parcel of article grouping operations (e.g., Cruver, Aronsson, Peterman et al. & Pundsack et al.) considered welcomed improvements relative to pin metering from below, it remains desirable to improve upon the state of the art which is believed to nonetheless possess limitations with regard to operational flexibility, repeatability, changeover, throughput, surge management, and overall process control vis-a-vis improved operative control linkages for, with, between and among the sought after processing operations.

For example, processing versatility remains desirable owing to the disparate character or configuration of or for the articles (e.g., can, bottle, jug, tray, etc.), the size or capacity of the articles (e.g., volume or mass), and/or the character of the article contents, i.e., the nature of the product (e.g., solid, aggregate, liquid (carbonated, non-carbonated)). Moreover, even for a select article processing run, both product and operational conditions may be varied or variable throughout the run owning to, among other things, a lack of homogeneity in the articles of the bulk article flow, or the character of the conveying surfaces of the conveying mechanisms of the line due to spills, periodic wash downs, etc.

In light of the foregoing operational and/or system approaches with regard to article conveying, metering, grouping, group separation and grouped article loading, packing or packaging etc., and presently perceived shortcomings associated with article metering which impact both upstream and downstream operations, it is believed advantageous to provide, among other things, a higher degree of precision, repeatability, product stability, and speed to metering operations via the utilization of trackless metering. More particularly, it is believed advantageous to leverage cooperatively driven servo drive mechanisms, in either or both of rotary and linear forms, in an article metering apparatus in furtherance of effectuating a trackless orbit for an article metering tool. Moreover, it is believed advantageous to provide means, in the form of one or more control or feedback loops, for an article processing system wherein a property of an article/product per se may be detected, and/or wherein a change in a property of the article/product under process may be detected, and further still robust means which also or alternatively detects a property associated with the bulk flow of articles, and/or detects a change in a quality and/or character of the bulk flow of articles in furtherance of effectuating a "smart" metering.

SUMMARY OF THE INVENTION

An article metering system and method of article metering is generally provided. As to the system, it is primarily comprised of a conveyor section, for receipt of a bulk flow of articles and conveyance of spaced apart metered article groups downstream of an ingress portion thereof, and an article metering station characterized by an article metering apparatus characterized by a drive assembly and a driven member driven thereby. The driven member includes an end effector for select positioning between adjacent articles of articles of the bulk flow of articles received by the conveyor section in furtherance of delimiting a downstream spaced apart metered article group characterized by a select number of rows and columns. The drive assembly includes cooperatively driven servo drives to effectuate travel of the end effector in either of a downstream article flow direction or an upstream article flow direction, and an up/down direction in relation to articles of the bulk flow of articles received by the conveyor section.

Among contemplated embodiments, systems characterized by a transfer device are described and shown. More particularly, an ingress portion of a conveyor section, such as a sweep conveyor or the like, may be suitably equipped with a transfer device, e.g., a retractable transfer device. A downstream most portion of the bulk flow articles are selectively supported and conveyed thereupon/thereby at a bulk flow velocity, with an altered state or condition for such device permitting transfer of an article group to the sweep conveyor having a velocity greater than the bulk flow velocity so as to facilitate the formation of a spaced apart metered article group.

Moreover, various contemplated alternate metering apparatus embodiments for the disclosed article metering systems are identified, described and generally illustrated. For example, contemplated cooperatively driven servo drive mechanisms of the apparatus drive assemblies include either of rotary driven servo drive mechanisms or linearly driven servo drive mechanisms.

Further still, article metering stations characterized by single or dual article metering apparatus are contemplated and presented. In an especially advantageous embodiment, the article metering apparatus substantially comprises a parallel robot, more particularly, a delta 2 (D2) robot.

As to the method of article metering, a bulk flow of articles is generally and preliminarily established, more particularly, a bulk flow of articles characterized by at least a single row of flowing articles from which a preselect number of downstream most articles of the bulk flow of articles are to be operated upon in furtherance of establishing spaced apart metered article groups. Provisions for an article metering station are made, more particularly, an article metering station into which the bulk flow articles flow. The article metering station is generally characterized by cooperatively driven servo mechanisms and a tool operatively supported thereby so as to selectively orbit the tool over a preselect number of downstream most articles of the bulk flow of articles, and into the downstream most articles of the bulk flow of articles so as to delimit a metered article group. The tool is selectively interposed between adjacent articles of the downstream most articles of the bulk flow of articles so as to delimit a metered article group and facilitate and/or effectuate an acceleration of the metered article group in relation to the bulk flow articles so as to establish a spaced apart metered article group.

Finally, in connection to both the contemplated article metering system and method, either or both of article/product property sensing/detecting and bulk flow article property sensing/detecting is advantageously undertaken, preferably, but not exclusively, in connection to the drive assembly of the article metering apparatus. Via one or more feedback systems/loops, in process article and/or bulk flow article assessments may be made, with a commensurate altering or modification of one or more processing operations responsive to the detection condition or change thereto. For example, and without limitation, it is contemplated that such monitoring/sensing be advantageously part-and-parcel of a surge feedback control in furtherance of the establishment of smart metering whereby overall improved process management, and increased throughput with a minimization of downtime is effectuated. More specific features and advantages obtained in view of those features will become apparent with reference to the drawing figures and DETAILED DESCRIPTION OF THE INVENTION.

BRIEF DESCRIPTION OF THE DRAWINGS & DEPICTIONS THEREOF

Figure 3B:
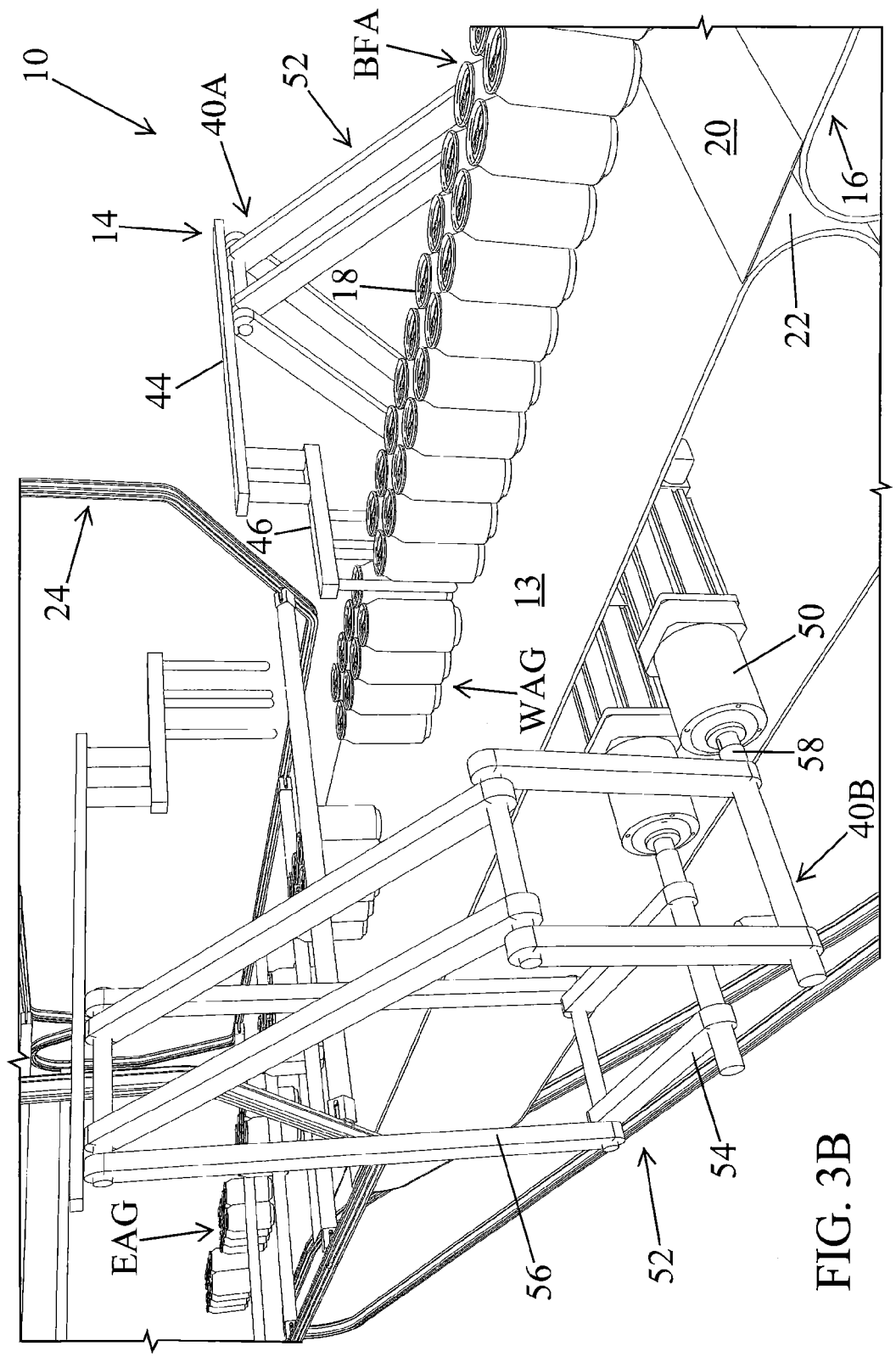
Figure 3C:
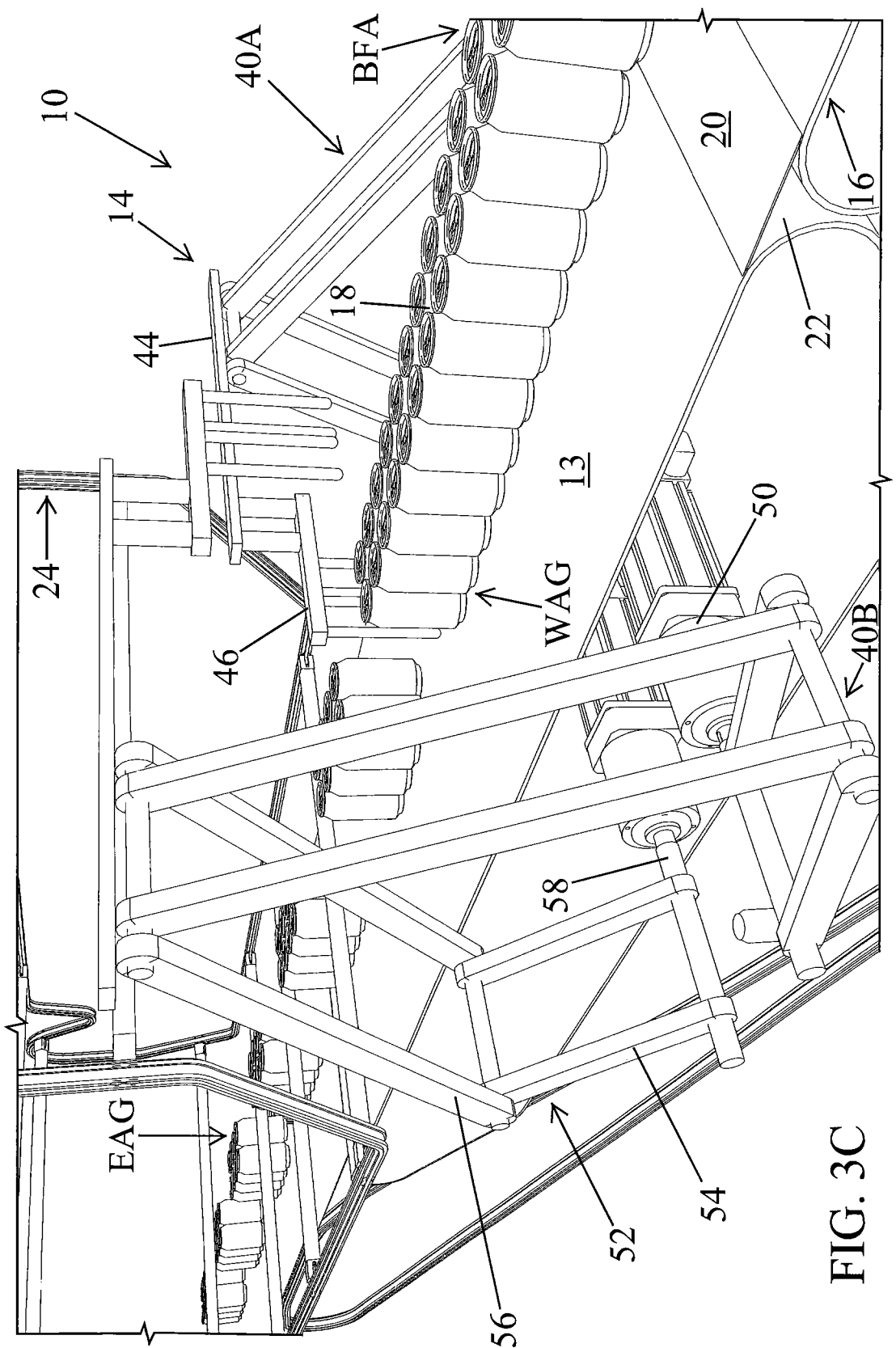
Figure 4:
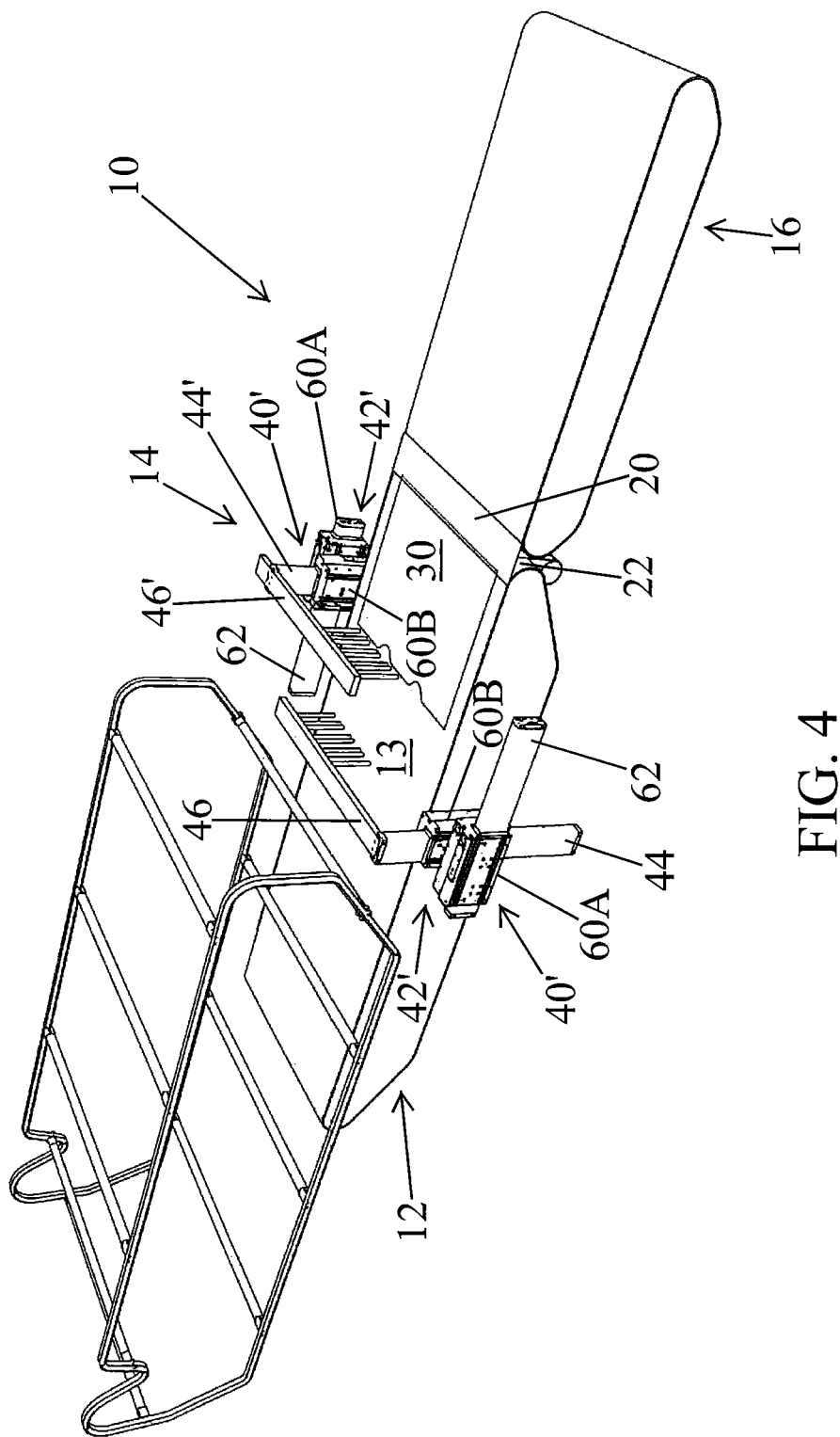

FIGS. 3A-3C depict an alternate non-limiting article metering station, perspective view slightly from above, characterized by a conveyor section and article metering apparatuses, article flow right to left, spaced apart established article group (EAG) and a working article group (WAG) indicated, relative to the bulk flow articles (BFA), at select process intervals represented by each of FIGS. 3A-3C;

FIG. 4 depicts a further non-limiting article metering station, perspective view slightly from above, characterized by a conveyor section and an alternate article metering apparatus pair, article flow right to left; and, FIGS. 5A-5E depict a variant of the article metering station of FIG. 4, side elevation article flow left to right, an established article group (EAG), and a working article group (WAG) indicated relative to the bulk flow articles (BFA) at select process intervals represented by each of FIGS. 5A-5E.

All figures have been prepared to facilitate and/or enhance an understanding of the basic teachings of the present invention, and/or the concepts underlying same. Extensions of the figures with respect to number, position, relationship, and dimensions of the parts to form one or more preferred embodiments or variants thereof may be explained or is understood to be within the skill of the art after the following description has been read and understood. Further, the exact dimensions and dimensional proportions to conform to specific force, weight, strength, and similar requirements relative to, e.g., processing objectives, will likewise be within the skill of the art after the following description has been read and understood.

Where used in the various figures of the drawings, the same numerals designate the same or similar parts. Furthermore, when the terms "side," "end," "bottom," "first," "second," "laterally," "longitudinally," "row," "column," and similar terms are used herein, it should be understood that these terms have reference only to the structure shown in the drawings as it would appear to a person viewing the drawings and are utilized only to facilitate describing illustrative embodiments or variants thereof.

DETAILED DESCRIPTION OF THE INVENTION

Preferred, non-limiting structures and/or mechanisms relating to and for improved robust article metering are generally presented throughout the figures of the subject disclosure. By way of overview, systems and/or processes depicted in FIGS. 1-3A are characterized by at least a single metering apparatus embodied by a parallel robot for effectuating a trackless, variable path, variable pitch article metering. In contrast to the rotary servo driven robotic mechanisms of FIGS. 1-4, linear servo driven mechanisms, e.g., a gantry system as per the article metering systems of FIGS. 4 & 5, are contemplated to effectuate a trackless, variable path, variable pitch article metering. Finally, it is to be initially noted that particularly advantageous and non-limiting article metering processes are further characterized by a "gap" forming operation with respect to a downstream segment of the bulk flow articles to facilitate or enhance article collation and grouping, as by an article transfer device moveable between extended and retracted positions (e.g., see the article metering systems of FIGS. 1, 5, & 6A) and/or means, in the form of one or more control or feedback loops part-and-parcel perhaps of a larger process "management" system, for an article processing system wherein a property of an article/product per se may be detected, and/or wherein a change in a property of the article/product under process may be detected, and further still robust means which also or alternatively detects a property associated with the bulk flow of articles, and/or detects a change in a quality and/or character of the bulk flow of articles in furtherance of effectuating a "smart" metering.

Notionally, there is shown metering systems (FIGS. 1 & 4, and the system variants thereof depicted in each of FIGS. 3A & 5A, respectively) generally characterized by a conveyor section for receipt of a bulk flow of articles (BFA) at an ingress portion thereof (see e.g., FIG. 2 in relation to the system of FIG. 1), and for conveyance of spaced apart metered article groups (i.e., established article groups (EAG)) downstream of the ingress portion thereof, and an article metering station characterized by an article metering apparatus wherein working article groups (WAG) are delimited.

The article metering apparatus, generally and fairly, is characterized by a drive assembly and a driven member or element driven thereby. The driven member includes a select end effector or tool for select positioning between adjacent articles of articles of the bulk flow stream of articles received by the conveyor section in furtherance of delimiting a downstream spaced apart metered article group, with the character/configuration of the metering tool being generally a function of the articles being processed/metered. Article metering stations characterized by a single article metering apparatus are contemplated, and shown (FIGS. 1 & 5A), as are article metering stations characterized by dual (i.e., two) article metering apparatuses (FIGS. 3A & 4), with synchronous operation of article metering apparatuses to effectuate alternating, sequential "A"/"B" article groupings.

As will be later developed and particularized, the drive assembly includes cooperatively driven servo drives or mechanisms, e.g., and as shown, rotary drive servo mechanisms characteristic of the metering apparatuses of either of FIG. 1 or 3A, or linear drive servo mechanisms characteristic of the metering apparatuses of either of FIG. 4 or 5A, to effectuate travel of the end effector in either of a downstream article flow direction or an upstream article flow direction, and an up/down direction in relation to articles of the bulk flow of articles received by the conveyor section in furtherance of establishing collated and separated groups of articles.

As will become apparent as this discussion proceeds, the metering apparatus of the metering station periodically retains the bulk flow of articles at a downstream most locus of the bulk flow of articles received by the conveyor section. The article metering system, in light of such circumstance, may advantageously, but not necessarily further include, or be characterized by a load monitoring/sensing controller or control loop, e.g., a surge feedback control, alone or integral to the contemplated process "management" system. Load monitoring and/or sensing is undertaken in connection to the drive assembly of the article metering apparatus, via, e.g., current sensing via the program logic controller of the servo motor drive, with control of another process system parameter, for instance, a conveyor of the conveyor section, selectively effectuated to manage (i.e., relieve) bulk flow article surge, and thus eliminate or at least reduce surge related process flow stoppages/aberrations.

Finally, and in the further context of article flow management which, to at least some extent has a bearing upon the formation of spaced apart metered article groups, the ingress portion of the conveyor section may advantageously, but not necessarily, include a retractable transfer device not inconsistent with Applicant's prior teachings (see e.g., U.S. Pat. No. 6,843,360, U.S. Pat. No. 7,533,768, USPN US 2011/0067975 and/or WO 2009/124026 (USPN US 2011/0005898)), or, alternatively, Applicant's prior "endless loop" non-retractable transfer teaching (U.S. Pat. No. 8,011,495), or portions thereof, may be leveraged in an adaptation of the contemplated article metering system. Essentially, a downstream most portion of the bulk flow articles may be selectively supported and conveyed by/upon the retractable transfer device at a bulk flow velocity, with retraction of the retractable transfer device transferring an article group to a conveyor of the conveyor section having a velocity greater than the bulk flow velocity so as to effectuate formation of a spaced apart metered article group. Such arrangement is contemplated for high/higher speed article metering, with such approach having particular utility for a "windowless" presentation of articles (i.e., for contiguous articles lacking appreciable spacing in "plan" view, e.g., rectangular cartons of uniform cross section as opposed to bottles having a tapered or tapering neck) such that the end effector may expeditiously and effectively be introduced into the flow of articles in furtherance of any of article metering, article group aligning (upstream or downstream), or article group spacing and/or article group outfeed or transfer. Moreover, such approach is believed particularly advantageous in the context of an article metering station characterized by a single article metering apparatus.

Figure 1:
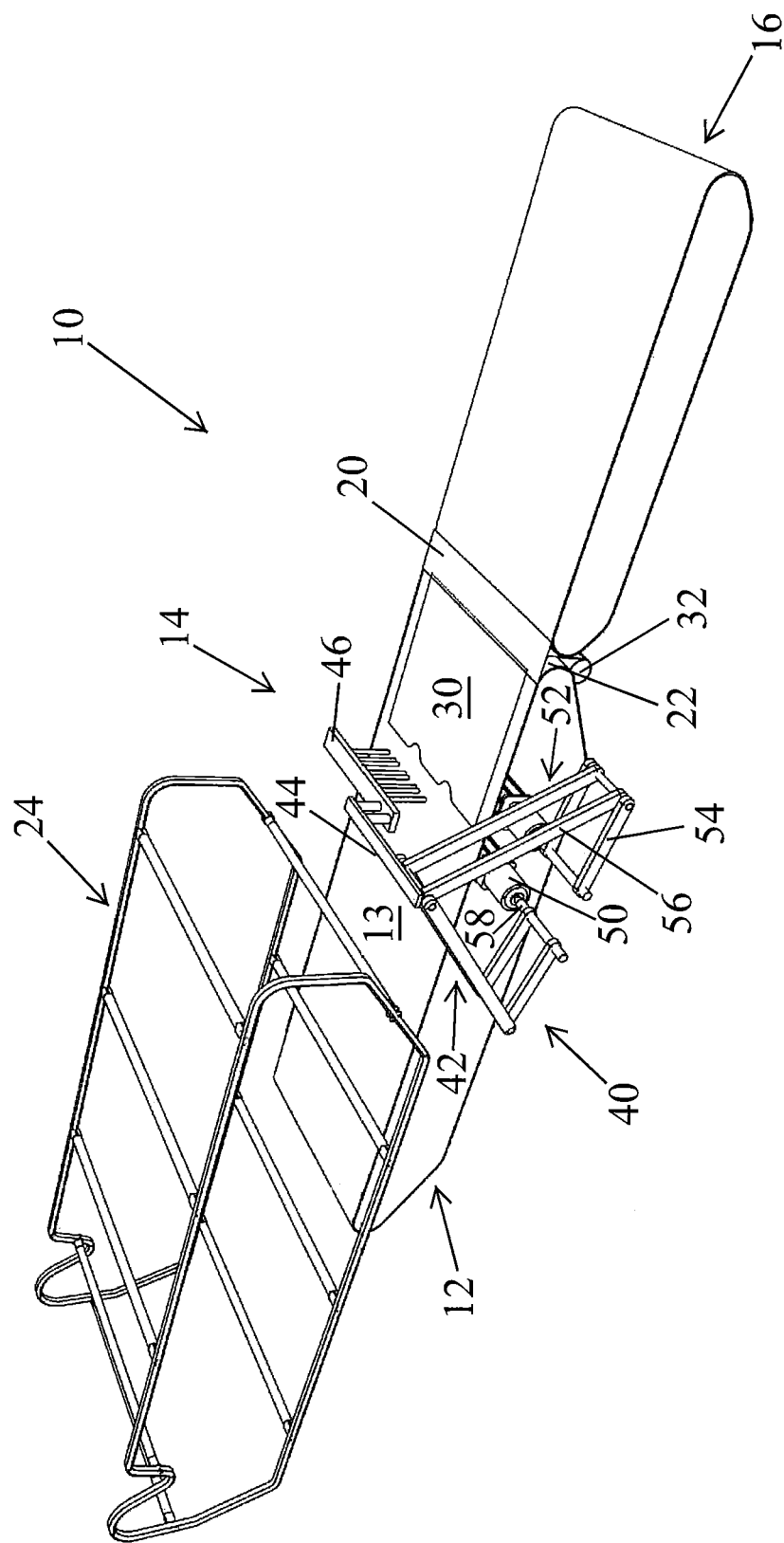
FIG. 1 depicts an article metering station, perspective view slightly from above, characterized by a conveyor section and an article metering apparatus, article flow right to left.
Figure 2:
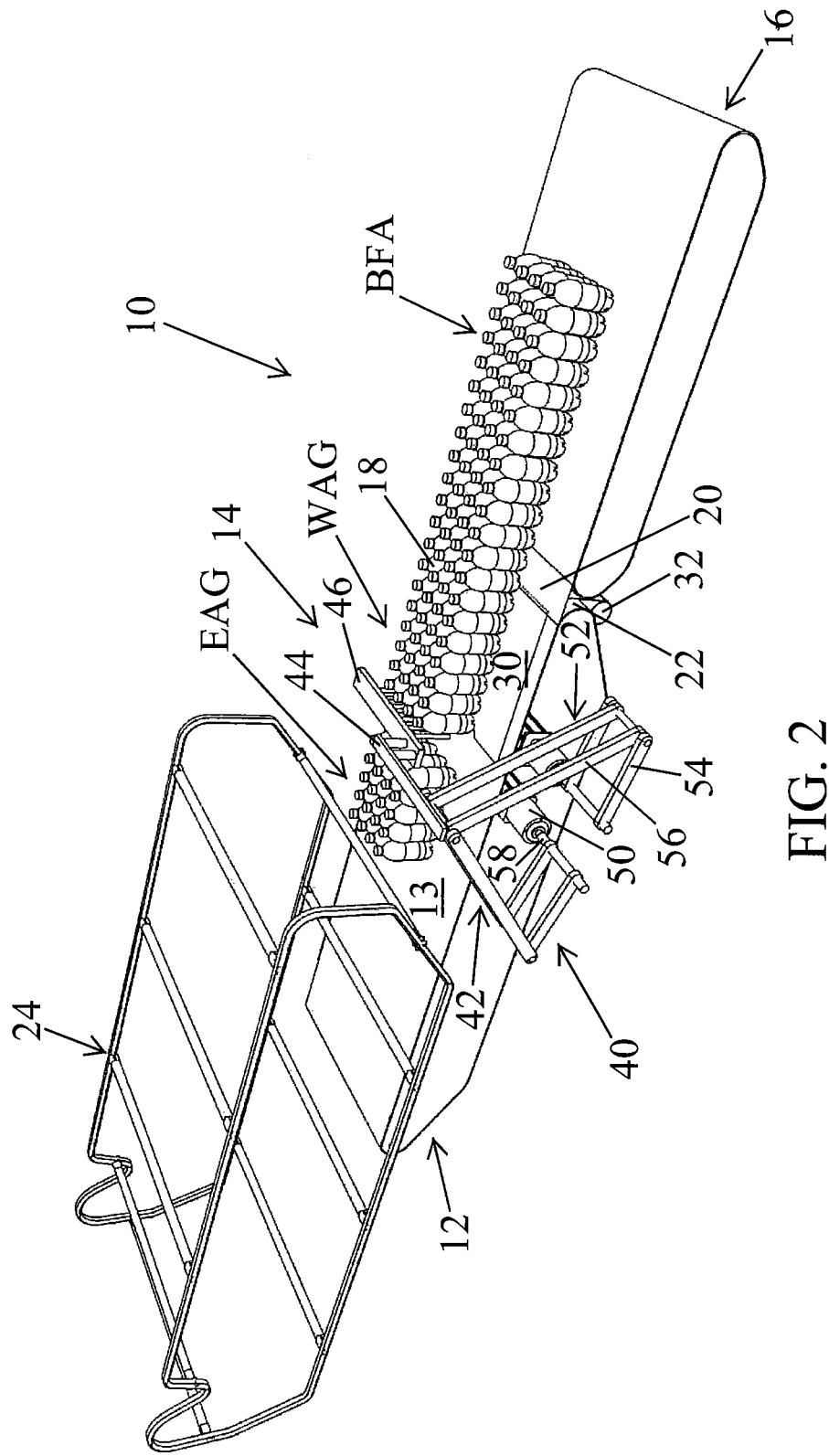
FIG. 2 depicts article metering operations at the article metering station of FIG. 1, an established article group (EAG) indicated, relative to bulk flow articles (BFA)

With particular reference now to FIGS. 1 & 2, and selectively to FIG. 3A, there is shown an article metering system 10 characterized by a conveyor section, e.g., a sweep conveyor 12 as schematically indicated, and an article metering station 14. As is generally known, an infeed conveyor 16 as schematically indicated supplies a bulk flow of articles (BFA), FIG. 2, presenting windows 18, or, more generally, an ordered flow of articles having origins in an upstream bulk article source (not shown). Articles conveyed by the infeed conveyor 16 travel downstream at a rate that is generally less than the downstream travel rate associated with the sweep conveyor 12. A static transfer plate 20 or the like traverses an inherent gap 22 between the infeed 16 and sweep 12 conveyors to facilitate article transfer or initial article transfer as the case may be. Adjacently downstream of the article metering station is, as schematically indicated, an advantageous sweep bar mechanism 24 (see e.g., U.S. Pat. No. 6,843,360 for particulars as warranted), however, it should be appreciated that the function of such mechanism is illustrative of a representative, non-limiting operation upon metered article groups, i.e., established article groups (EAG), FIG. 2.

Advantageously, and as schematically shown, an ingress portion of the conveyor section includes a retractable transfer device 30 upon which arrayed articles are supported (FIG. 2; but see the article metering system of FIG. 3A). Transfer device 30 is moveable between an extended position and a retracted position. Device 30 extends over conveyor 12 in the extended position, and in the preferred form also extends over conveyor 12 beyond transfer plate 20 in the retracted position. In the most preferred form, device 30 is in the form of a thin piece of flexible material such as a belt requiring external support to allow articles to be supported thereon. Thus, in the preferred form, device 30 in the form of a thin piece of material engages and is supported by belt 13 to allow product to be supported upon device 30. In the preferred form, device 30 is moved from its extended position to its retracted position by having its upstream end secured to the periphery of a roller 32 which is rotated such as by a servo motor (not shown). Thus, as the roller is rotated, device 30 is wrapped around the roller and thereby has a shorter exposed length. In the most preferred form, device 30 is moved from its retracted position to its extended position by movement with belt 13 of conveyor 12 as the result of friction between device 30 and belt 13, with the servo motor tending to limit the velocity of device 30 to equal that of conveyor 12. It should be appreciated that device 30 could be moved by other manners including but not limited to by being reciprocated such as by air cylinders or like. Likewise, device 30 could be formed in other manners such as a flat piece of nonflexible material which does not rely upon belt 13 for external support and which could be slid under transfer plate 20 in its retracted position. However, it is believed that the flexible material forming device 30 is advantageous for several reasons including inertia concerns, costs, and the like.

An article metering apparatus 40, either a single apparatus as per the system of FIG. 1, or the dual apparatuses of the system of FIG. 3A, may be fairly characterized as a parallel robot, e.g., a delta 2 robot. The apparatus generally includes a drive assembly 42 and a driven member 44 driven thereby, more particularly, a driven member equipped with an end effector, e.g., a fork or pinned tool as shown. The drive assembly 42 advantageously, but not necessarily, includes cooperatively driven servo drive mechanisms, namely, paired rotating servo drive mechanisms 50, and a linkage characterized by a set of arms, each arm 52 having first 54 and second 56 arm segments. First arm segment 54 of each arm 52 extends from each output shaft 58 of the rotating servo drive mechanisms 50, second arm 56 pivotingly extends from first arm segment 54, each second arm segment 56 being generally coterminous in support of driven member 44.

Having generally outlined features for the system of FIG. 1 and to a great extent the system of FIG. 3A, operations with regard to the FIG. 1 system variant will be taken up in connection to the system and depictions of FIG. 3A-3C. As a threshold matter, and briefly, the article metering system 10 depicted includes a conveyor section, e.g., a sweep conveyor 12, for receipt of a bulk flow of articles, in this case from infeed conveyor 16, and an article metering station 14 characterized by dual article meter apparatuses 40A, 40B, each apparatus 40A, 40B substantially comprised of a parallel robot. The driven member 44, and more particularly the end effector thereof 46, overlies the belt 13 of the sweep conveyor 12, with the cooperatively driven rotary servo drive mechanisms 50 advantageously, but not necessarily, underlying the belt 13 of the sweep conveyor 12, and more particularly as shown, the rotary servo drive mechanisms 50 are supported such that the belt 13 of the sweep conveyor 12 substantially circumscribed same. Via such arrangement, the drive assembly linkage may be proximally adjacent the longitudinally extending belt 13 of the sweep conveyor 12 as shown.

With particular reference to FIG. 3A, two rows of beverage containers are shown generally flowing as bulk flow articles (BFA) figure right to figure left, with the sweep conveyer 12 in continuous, uninterrupted receipt of articles from the infeed conveyer 16. An end effector 46 associated with a first article metering apparatus 40A (i.e., a "background" or rear apparatus) is shown in a substantially engaged (i.e., inserted) hold posture in relation to the bulk flow articles in furtherance of delimiting a 2×4 article group or array (i.e., a working article group (WAG)). At the downstream most extremity of the working article group, an end effector 46 of a second article metering apparatus 40B (i.e., a "foreground" or front apparatus) is shown in a posture for effectuating alignment for the working article group. Downstream of the working article group, in a spaced apart condition, is an established article group (EAG) of a series of established article groups. The newly metered established article group departs article metering station 14, and as shown, passes toward a sweep bar mechanism 24 for further enhanced advancement of the established article group.

With particular reference to FIG. 3B, with continued select driven actuation of drive assembly links of the first and second article metering apparatuses 40B, the as-shown process relationships result. More particularly, end effector 46 of first apparatus 40A maintains a retention and general surge holding posture with regard to the bulk flow articles while end effector 46 second apparatus 40B assumes a downstream most release posture such that an initial and soon expanding gap is formed between the working article group and the retained bulk flow articles. It is to be appreciated in connection to the subject system, that incorporation of a surge feedback control, essentially linking the monitored/sensed load having origins in, e.g., bulk flow article pressure, with regard to either or both of the article metering apparatuses greatly enhances overall process management, with a variety of system parameters being amendable to select responsive on-the-fly alteration to effectuate smart metering.

Finally, with particular reference FIG. 3C, with further select driven actuation of drive assembly links of the first and second article metering apparatuses, end effector 46 of second apparatus 40B travels upstream in furtherance of bulk flow article engagement so as to commence metering and formation of a sequential working article group. End effector 46 of second article metering apparatus 40B generally functions to retain the bulk flow articles and align the downstream most article pair.

With particular reference now to FIG. 4, there is shown a further article metering system 10 generally consistent with that of FIG. 1 but for particulars of an article metering apparatus 40' of the article metering station 14 thereof. As was the case with the system of FIG. 3A, dual article metering apparatuses are contemplated, and believed advantageous, however, a single such apparatus, slightly modified, is shown for the metering system of FIG. 5A.

The article metering apparatus 40' generally includes a drive assembly 42' and a driven member 44' driven thereby, more particularly, a driven member 44' equipped with an end effector 46', e.g., a forked tool as shown. The drive assembly 42' advantageously, but not necessarily, includes cooperatively driven servo drive mechanisms, namely, paired linear servo drive mechanisms 60a, 60B. Owing to the absence of a gear box as is required of the earlier discussed rotating servo drive mechanisms, the subject article metering apparatus is especially amenable to effective, direct surge monitoring and/or sensing in furtherance of the implementation of an overarching surge feedback control implicating a variety of readily controllable mechanisms and/or process parameters to better manage overall process flow and thus permit greater article throughput and increased overall efficiency.

A first linear servo drive mechanism 60A of article metering apparatus 40' is adapted for translation upon a fixed travel rail 62. Advantageously, but not necessarily, the static rail 62 is supportingly positioned proximally adjacent sweep conveyor 12 as shown, with translation generally corresponding to/with upstream/downstream article flow.

A second linear servo drive mechanism 60B of article metering apparatus 40' is generally supported or otherwise united to first linear servo drive mechanism 60A for travel therewith, more particularly, second linear servo drive mechanism 60B is angularly oriented in relation to first linear servo drive mechanism 60A in furtherance of effectuating an alternate translation of driven member 44 of the apparatus 40', and thus a reversible translation for end effector or metering tool 46. Second linear servo drive mechanism 60B retains and passes, or is adapted to retain and pass driven member 44. Via such arrangement, a swift accurate, responsive orbit (i.e., travel path) for the metering implement is enabled, an orbit which may be quickly altered, whether in relation to the configuration or shape of the orbit, or in relation to the speed of travel of a segment or portion of the orbit.

Figure 5A:
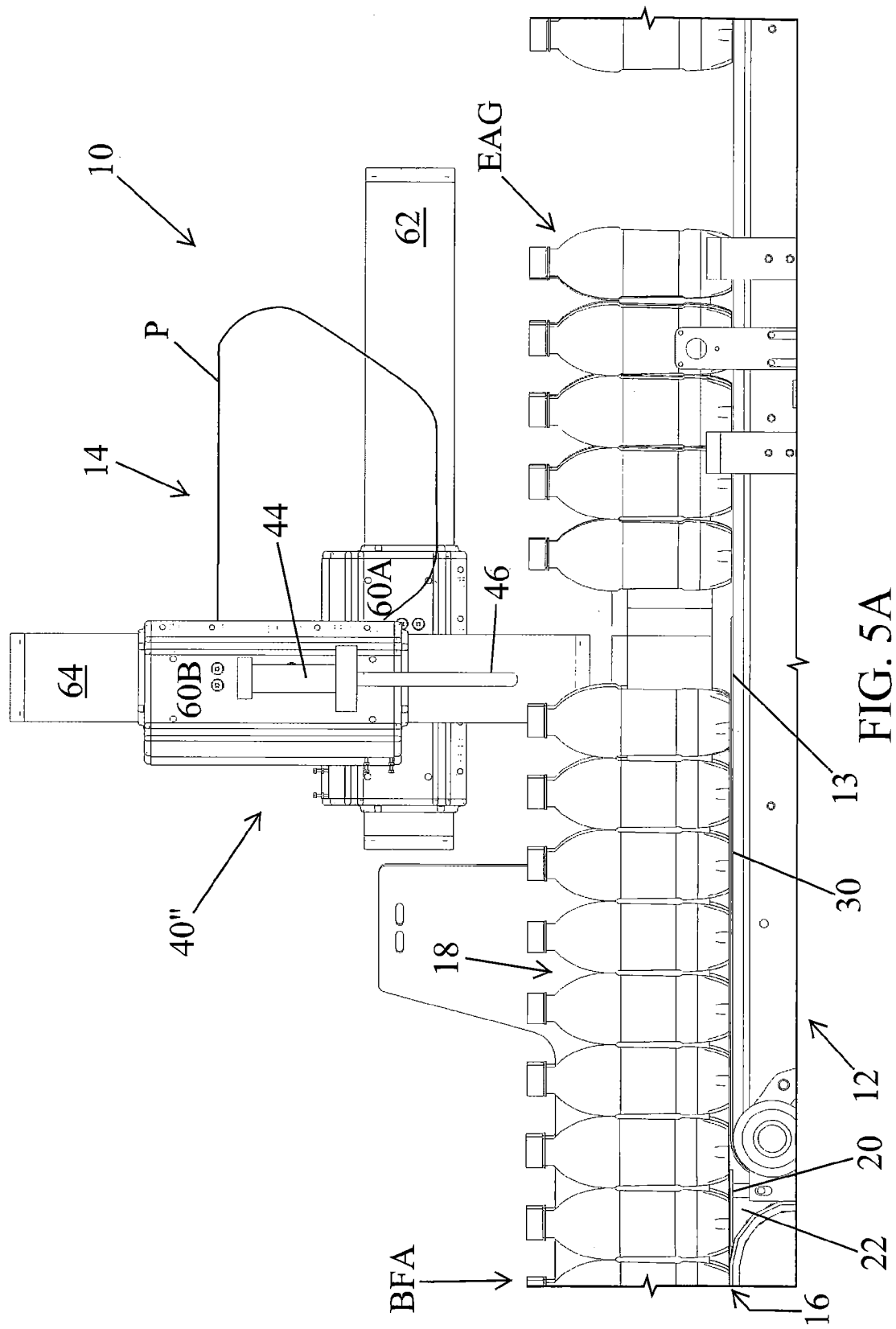

Having generally outlined features for the system of FIG. 4, operations undertaken with regard to a variant thereof will be taken up in connection to the system of FIG. 5A, and depictions of FIGS. 5A-5E. In lieu of a presentation of similarities, points of departure are to be briefly noted in advance of an operational synopsis of the contemplated process.

First, in contradistinction to the dual apparatus approach of FIG. 4, a single apparatus 40" is indicated. Second, each of the linear servo drive mechanisms 60A', 60B' of the cooperatively driven linear servo drive mechanisms is correspondingly supported for translation upon a fixed travel rail, for instance, first linear servo mechanism 60A' is adapted for translation upon a travel rail 62', with second linear servo mechanism 60B' adapted for alternate translation upon a travel rail 64 with first linear servo drive mechanism 60A' adapted to support travel rail 64. Third, the relative position of the metering apparatus is to be noted, namely, travel rail 62', alternately, the upstream/downstream travel rail, is indicated in an elevated condition relative to the belt 13 of the sweep conveyor 12, namely, as shown, but not necessarily, at an elevation greater than the article elevation. Finally, common landmarks/indicia are generally indicated as the system of FIG. 4, e.g., the several status conditions for the articles being processed/under process, namely, figure left to right, bulk flow articles (BFA), working article group (WAG), and established article group (EAG), a sweep conveyor 12 with travel figure left to right, a retractable transfer device 30, and end effector travel path (P) also indicated.

With particular reference to FIG. 5A, first linear servo drive mechanism 60A' is shown at an upstream most locus, the end effector associated with second linear servo drive mechanism 60B' positioned in a state of advancement toward a free, downstream end of the bulk flow articles, an established article group positioned within the article metering station 14 and, as indicated, in a spaced apart condition relative to the working article group. Retractable transfer device 30 is shown in substantial but not yet maximum extension relative to the belt 13 of sweep conveyor 12. A downstream most segment of bulk flow articles of infeed conveyor 16 are shown in receipt by/upon retractable transfer device 30, a subset of the articles thereof, i.e., a working group of articles, for subsequent transfer to sweep conveyor 12.

Figure 5B:
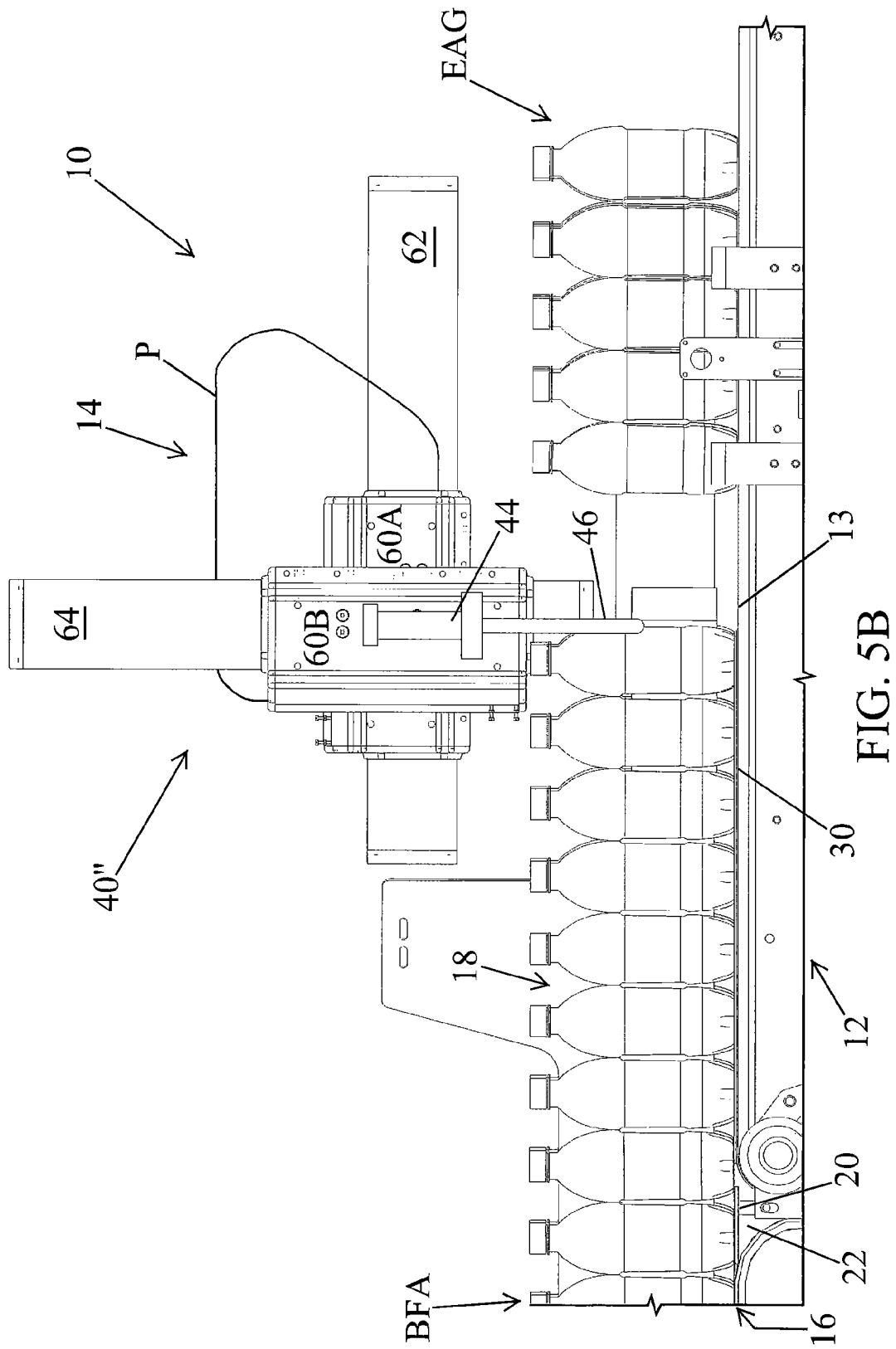

With reference now to the remaining operational or processing sequences of FIGS. 5B-5E, after select actuation of each of the servo drive mechanisms 60A', 60B', the relationships for, between and among the FIG. 5A structures or elements are as indicated in FIG. 5B. With engagement of end effector 46 with the downstream face of the working article group, second servo drive mechanism 60B' proceeds downstream at a relatively constant height (FIGS. 5B-5D), and at a velocity not inconsistent with the velocity of the extended and further extending retractable transfer device 30 (i.e., the metering apparatus 40" is in a period of retaining the bulk flow of article).

Figure 5C:
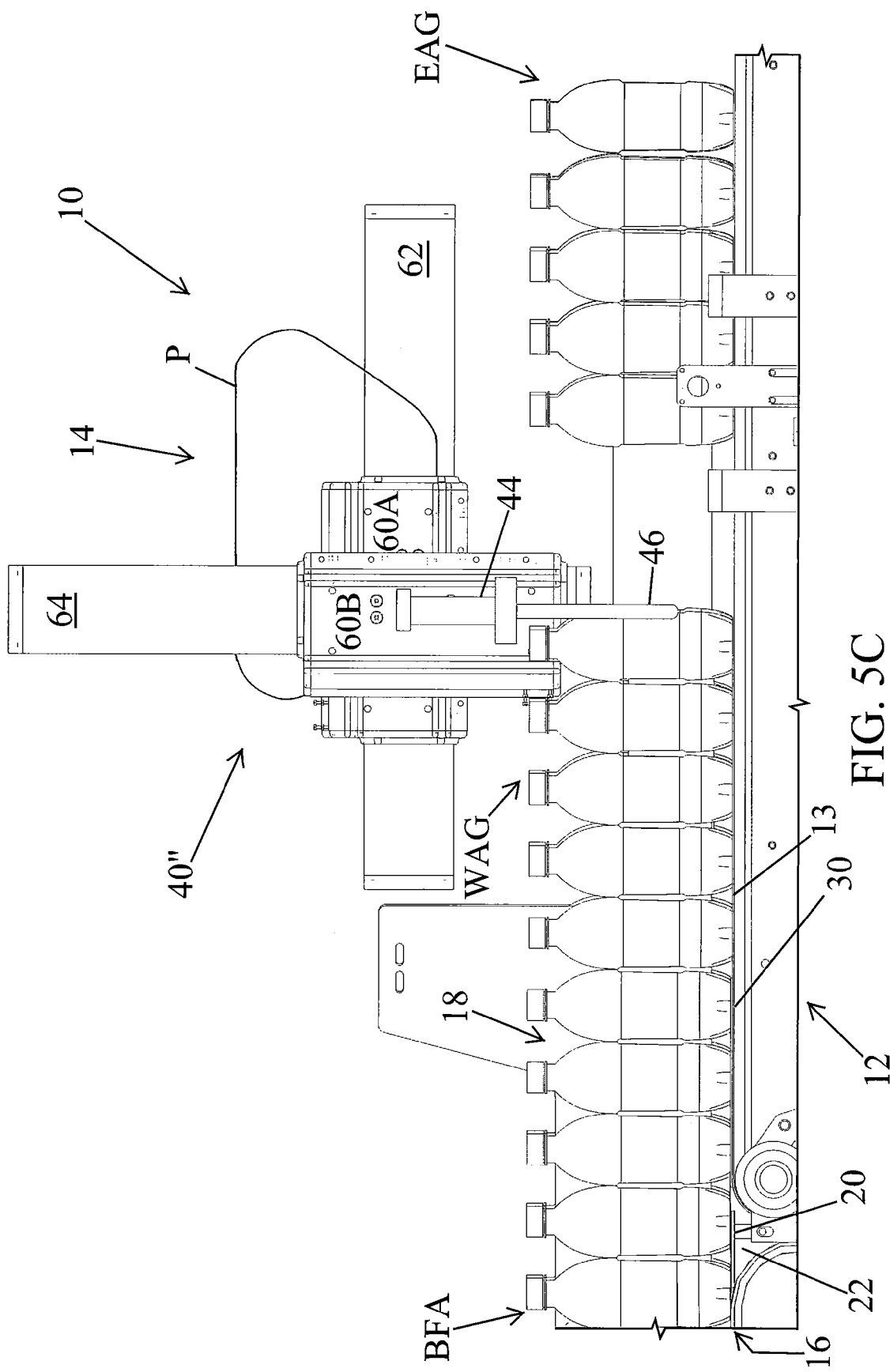
Figure 5D:
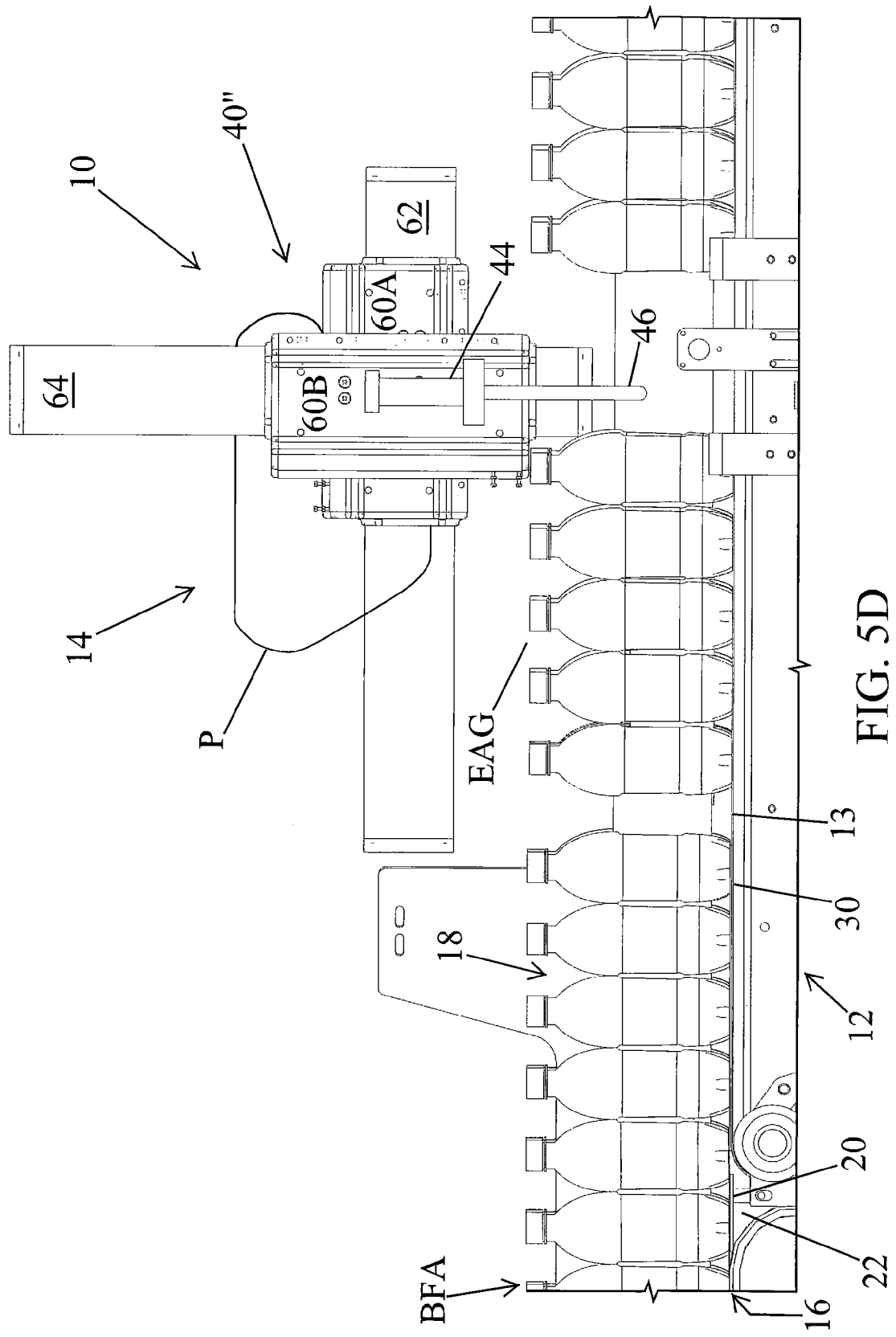
Figure 5E:
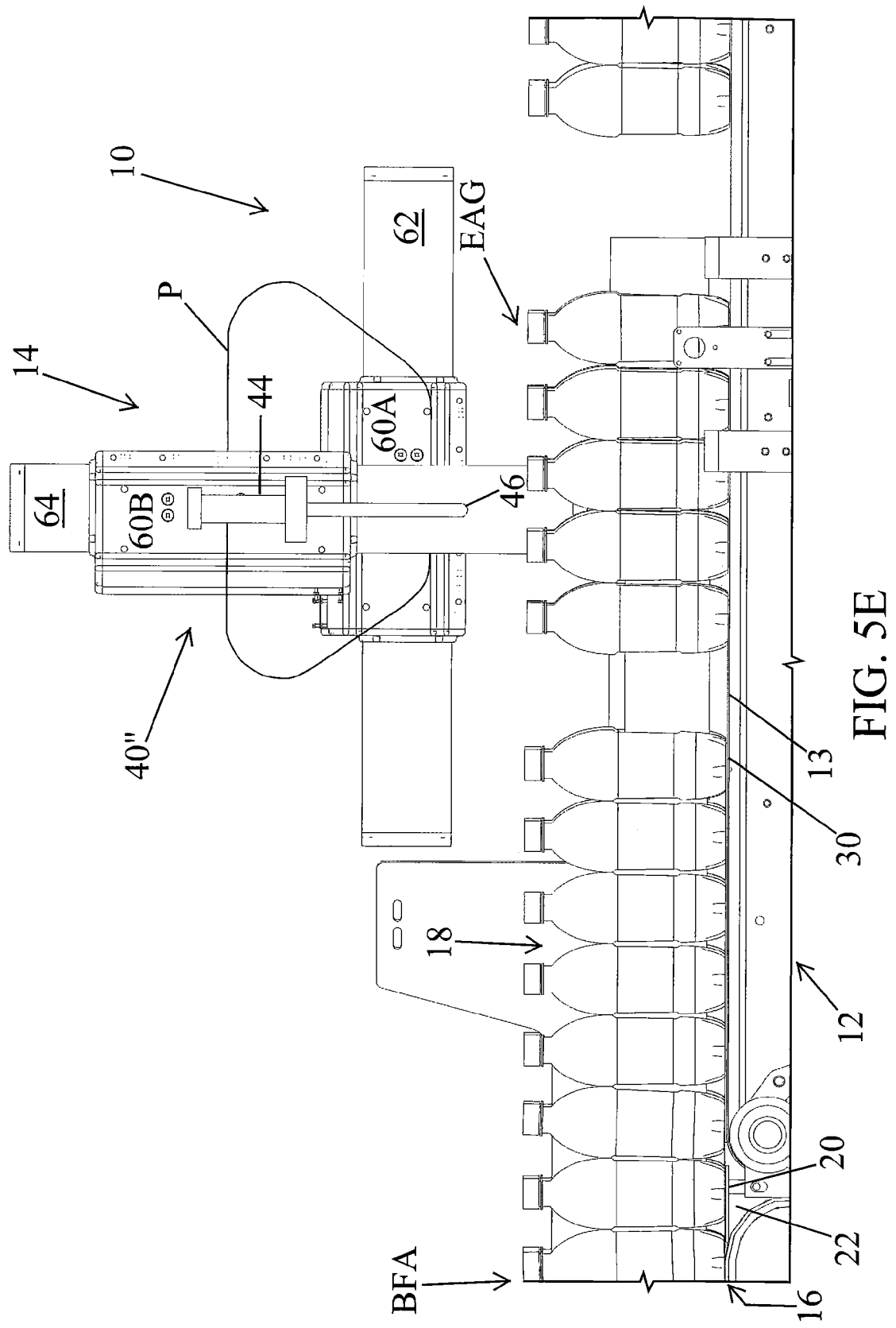

As is appreciated with reference to FIGS. 5A-5C, the FIG. 5B posture for illustrated retractable transfer device 30 is a relative downstream most posture, indicative of a substantial full extension thereof relative to the belt 13 of the sweep conveyor 12. As the retraction of retractable transfer device 30 (FIG. 5C) effectuates a progressive transfer of the articles of the working article group to sweep conveyor 12, a commensurate, measured but nonetheless responsive velocity increase is effectuated for travel (i.e., downstream travel) of the driven member 44/end effector 46 in furtherance of establishing/maintaining a downstream most alignment for the working article group, and in furtherance of delimiting an established article group (FIG. 5D) subsequent to a further relative increased travel (i.e., downstream) velocity for the driven member 44/end effector 46 whereby end effector 46 concludes its downstream travel in a spaced apart condition from the established article group. As end effector 46 essentially distances itself from the established article group, retractable transfer device 30 commences downstream extension (FIG. 5C→FIG. 5D). Thereafter, as is generally indicated and appreciated with reference to FIG. 5E, further select actuations of the servo drive mechanisms 60A', 60B' effectuate an elevated and reverse travel for the driven member 44/end effector 46 along an upper portion of travel path P.

While advantageous, non-limiting systems, apparatus, devices, mechanisms, methods, etc. relating to spacing of conveyed articles are depicted, described and/or readily ascertained with reference to the instant disclosure, alternate not insubstantial functional equivalents are likewise contemplated to effectuate a sought after on-the-fly pitch and path variation for conveyed articles. Presently known and future developed means for effectuating the noted functionalities are understood to be within the scope of the instant disclosure.

Thus, since the structures of the assemblies/mechanisms disclosed herein may be embodied in other specific forms without departing from the spirit or general characteristics That which is claimed:

1. An article metering system comprising:
   a. a conveyor section for receipt of a bulk flow of articles characterized by at least a single row of articles at a ingress portion thereof, and for conveyance of spaced apart metered article groups downstream of said ingress portion, the spaced apart article groups characterized by the at least single row of article and a select number of article columns; and,
   b. an article metering station characterized by an article metering apparatus comprising a drive assembly and a driven member driven thereby, said driven member including an end effector for select positioning relative to select adjacent articles of articles of the bulk flow of articles received by said conveyor section in furtherance of delimiting a downstream spaced apart metered article group characterized by the select number of article columns, said drive assembly comprising paired rotating servo drive mechanisms and a set of arms characterized by arm segments, each arm of said set of arms joining each rotating servo drive mechanism of said paired rotating servo drive mechanisms to said driven member, said arms laterally spaced from a longitudinally extending edge portion of said conveyor section, said end effector overlying the bulk flow of articles such that a tool of said end effector is selectively introduced into the bulk flow of articles from above so as to delimit the select number of article columns for the at least single row of articles.

2. The article metering system of claim 1 wherein said metering apparatus of said article metering station periodically retains the bulk flow of articles at a downstream most locus of the bulk flow of articles received by said conveyor section.

3. The article metering system of claim 1 wherein said metering apparatus of said article metering station periodically retains the bulk flow of articles at a downstream most locus of the bulk flow of articles received by said conveyor section during select positioning of said end effector at an upstream most upstream article flow locus associated with said upstream article flow direction for said end effector.

4. The article metering system of claim 1 in combination with a process management system, either or both of said conveyor section and said article metering apparatus of said article metering system selectively controllable by said process management system upon detection of a select article property, or change with respect thereto, and/or upon detection of a select bulk article flow property, or change with respect thereto.

5. The article metering system of claim 1 further comprising a surge feedback control, load monitoring/sensing undertaken in connection to said drive assembly of said article metering apparatus with control of a conveyor of said conveyor section selectively effectuated.

6. The article metering system of claim 1 wherein said article metering apparatus includes a load sensing/monitoring element for sensing/monitoring article surge associated with article accumulation during select positioning of said end effector between adjacent articles of articles of the bulk flow of articles conveyed by said conveyor section.

7. The article metering system of claim 1 wherein said article metering station is characterized by a further article metering apparatus, said further article metering apparatus synchronously operated in relation to said article metering apparatus.

8. The article metering system of claim 1 wherein said article metering station is characterized by a further article metering apparatus, said further article metering apparatus positioned in opposition to said article metering apparatus.

9. The article metering system of claim 1 wherein said article metering station is characterized by a further article metering apparatus, a first metered article group of sequential formed metered article groups delimited by said article metering apparatus, a second metered article group of sequential formed metered article groups delimited by said further article metering apparatus.

10. The article metering system of claim 1 wherein at least one rotating servo mechanism of said paired rotating servo mechanisms is supported at an elevation not greater than an elevation of a conveyor surface of said conveyor section.

11. The article metering system of claim 1 wherein at least one rotating servo mechanism of said paired rotating servo mechanisms is supported at an elevation not less than an elevation of a conveyor surface of said conveyor section.

12. The article metering system of claim 1 wherein at least one rotating servo mechanism of said paired rotating servo mechanisms is supported at an elevation substantially equal to an elevation of a conveyor surface of said conveyor section.

13. The article metering system of claim 1 wherein rotating servo mechanisms of said paired rotating servo mechanisms underlie a conveyor surface of said conveyor section.

14. The article metering system of claim 1 wherein said ingress portion of said conveyor section includes a retractable transfer device, a downstream most portion of the bulk flow articles selectively supported and conveyed thereupon at a bulk flow velocity, retraction of said retractable transfer device transferring an article group to a conveyor of said conveyor section having a velocity greater than the bulk flow velocity so as to effectuate formation of a spaced apart metered article group.

\* \* \* \* \*